United States Patent

[11] 3,630,090

[72] Inventor Otto Heinemann
 Ennigerloh, Germany
[21] Appl. No. 819,802
[22] Filed Apr. 28, 1969
[45] Patented Dec. 28, 1971
[73] Assignee Polysius AG
 Neubeckum, Germany

[54] PROCESS AND APPARATUS FOR DETERMINING THE DISTRIBUTION OF PARTICLE SIZES IN GROUND MATERIAL
 3 Claims, 3 Drawing Figs.

[52] U.S. Cl. ................................................. 73/432 PS
[51] Int. Cl. ........................................................ G01n 15/02
[50] Field of Search ........................................... 73/228,
 105, 432 PS, 432 R

[56] References Cited
 UNITED STATES PATENTS

| 3,504,552 | 4/1970 | Hiller | 73/432 PS |
| 3,318,156 | 5/1967 | Dietert | 73/432 R |
| 2,698,929 | 1/1955 | Greacen et al. | 73/228 |
| 2,961,871 | 11/1960 | Ricks | 73/105 |

FOREIGN PATENTS

| 369,601 | 7/1963 | Switzerland | 73/432 PS |

Primary Examiner—S. Clement Swisher
Attorney—Marshall & Yeasting

ABSTRACT: The particle size distribution in ground material is determined by bringing into contact with a layer of the ground material a mechanical sensing element which is deflectable with at least one degree of freedom, while a relative movement of predetermined constant velocity between the sensing element and the ground material takes place in a direction transverse to the direction in which the sensing element is deflectable. The resulting mechanical deflections of the sensing element are converted into electrical pulses, each of which is produced by contact of an individual particle of the material with the sensing element. In the resulting train of pulses, the number of pulses whose amplitude exceeds a threshold value which occur during a predetermined measuring interval of time are counted.

LEVELING AND COMPRESSING MECHANISM

PROCESS AND APPARATUS FOR DETERMINING THE DISTRIBUTION OF PARTICLE SIZES IN GROUND MATERIAL

The invention relates to a process as well as an apparatus for determining the particle size distribution in ground material.

In the grinding of material (for example ore or limestone) a predetermined particle size distribution often must be maintained. Thus in general the coarse fractions (for example between 90 and 500 microns) in the finished material must not exceed a predetermined proportion. One therefore limits the rated capacity of a grinding installation in general with predetermined residues of coarse material (for example over 200 microns and over 90 microns).

The previous methods of determining the particle size distribution in ground material (for example by screening of sifting) are extraordinarily time consuming and laborious and usually can be carried out only by sampling. This then can have the result that a grinding installation in the interval between two such samplings may produce insufficient finished material or may grind inefficiently. The previously known methods of determining the particle size distribution in ground material suffer the further disadvantage that they are poorly adapted for automation.

The object of the invention therefore is to provide a process which makes possible a rapid determination of the particle size distribution in ground material, in a particularly simple manner, and permits automatic operation.

In accordance with the invention, this object is achieved by bringing in contact with a layer of the ground material a mechanical sensing element whose deflecting movement has at least 1° of freedom; providing relative movement of a predetermined constant velocity, between the sensing element and the ground material, transverse to the direction of deflection of the sensing element; converting the mechanical deflecting movement of the sensing element into electrical current or voltage pulses; and counting, in this chain of pulses, the pulses whose amplitude exceeds at least one threshold value, which occur during a predetermined measuring interval of time.

As can be demonstrated by extensive comparative tests, in the process of the invention the pulse amplitude provides a measurement of the size of the particles, which pulse amplitude is exhibited by the pulses in question, while the pulse frequency is a measurement of the number of particles which come into contact with the sensing element in a predetermined relative movement between the material and the sensing element.

When various threshold values are established, and the pulses within a predetermined measuring interval of time which exceed the threshold values in question are counted, rather accurate evidence concerning the particle size distribution in the ground material is obtained. Since these analyses of the train of electrical pulses conveniently can be carried out electronically, the process according to the invention is excellently suited to automation.

Thus it also makes possible an ideal control of a grinding installation in such a manner that the desired particle size distribution can be maintained. The result which is provided by the process according to the invention of course can be used also for controlling a screening apparatus.

In accordance with a preferred embodiment of the invention the ground material is furnished in a thin layer on a belt conveyor which has a continuous linear movement. Preferably in this case the layer of ground material is leveled and compressed before it contacts the sensing element, so that independently of the accidentally more or less loose depositing of the material, uniform conditions are always provided for the sensing element which is deflected by the individual particles of the material.

In a first variant of the process according to the invention, a sensing element, for example in the form of a pin, penetrates into the layer of the ground material and is movable parallel to the surface of the layer as well as transversely to the direction of movement of the conveyor belt.

In a second alternative of the process according to the invention, the sensing element, for example in the form of a sliding shoe, lies upon the layer of the ground material and is movable perpendicular to the surface of the layer as well as transversely to the direction of movement of the conveyor belt.

In both cases, the sensing element is more or less strongly and frequently deflected by the particles of the ground material which move relative to the sensing element.

The transformation of the mechanical deflecting movement of the sensing element into electrical current or voltage pulses can take place in various ways. For this purpose, inductive, capacitive and piezoelectric transducers in particular are available. Further, it may be advantageous to modulate a carrier frequency current in accordance with the deflections of the sensing element. The application of the carrier frequency technique generally facilitates the designing of the amplifier which is connected to the output of the sensing element.

It is to be understood that, depending upon the further purpose to which the measurements yielded by the process of the present invention are to be applied, the most varied controlling, regulating and recording devices may be provided, in which the measurements obtained as to the particle size distribution in the ground material may be further processed.

Two embodiments of the invention are schematically illustrated in the drawings, in which.

A sample stream is divided from the finished ground material and is introduced in a thin layer 1 upon a conveyor belt 2 which is continuously moved linearly in the direction of the arrow 3.

Figure 1:
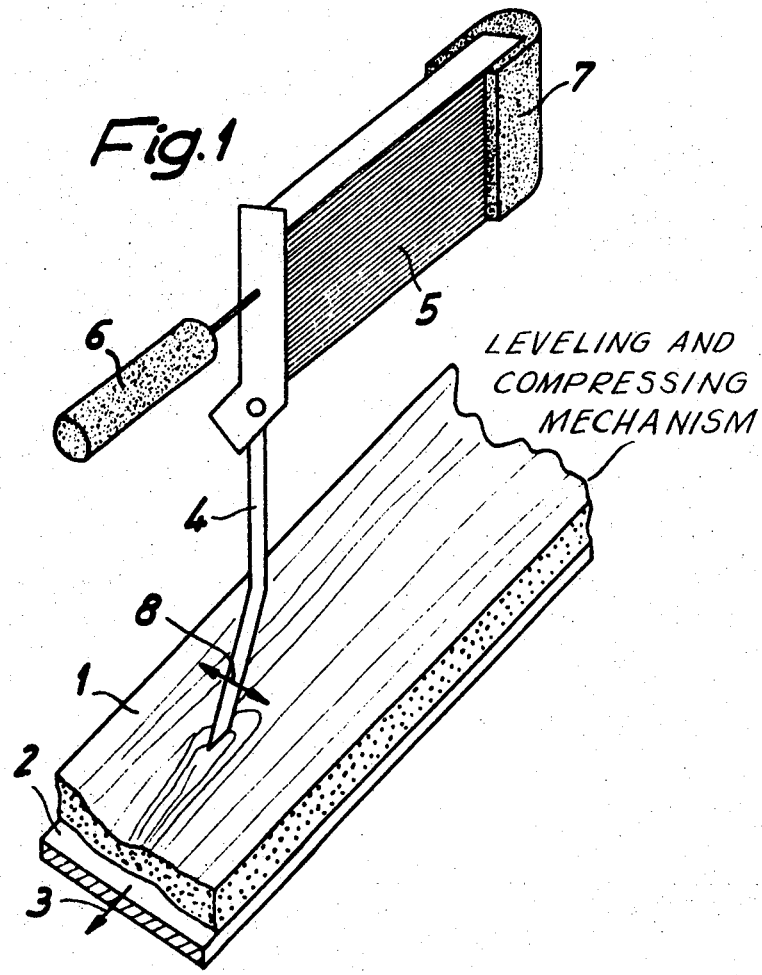
FIG. 1 is a schematic view of a first embodiment of an apparatus for carrying out the process according to the invention.

Above the conveyor belt 2 is provided a sensing element 4, which in the embodiment according to FIG. 1 is in the form of pin and penetrates somewhat into the layer 1 of the ground material. The layer 1 for this purpose is leveled and compressed ahead of the zone in which the sensing element 4 is arranged.

The sensing element 4 is connected to a piezoelectric crystal 5 which, by means of two rubber mounts 6, 7, is cushioned and suspended in such a manner that the sensing element 4 is movable in the direction of the double arrow 8, i.e., parallel to the surface of the layer 1 as well as transverse to the direction of movement (arrow 3) of the conveyor belt 2.

Figure 2:
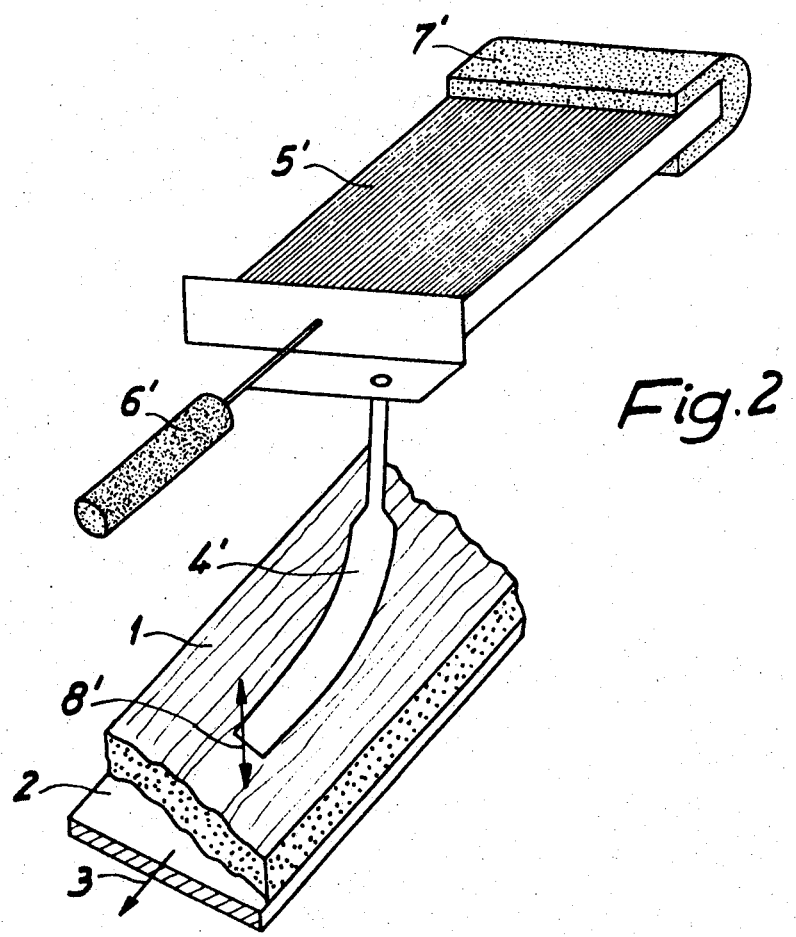
FIG. 2 is a schematic view of a further embodiment.

In the embodiment according to FIG. 2 the sensing element 4' is in the form of a sliding shoe and rests upon the layer 1 of the ground material. The crystal 5' connected with the sensing element 4' is supported in two rubber mounts 6', 7' in such a manner that the sensing element 4' is movable in the direction of the double arrow 8', i.e., perpendicular to the surface of the layer 1 as well as transverse to the direction of movement (arrow 3) of the conveyor belt 2.

The sensing element 4 or 4' is deflected by the individual particles in the layer 1 of the ground material, in the direction in which it is movable (arrow 8 or 8'). The piezoelectric crystal 5 or 5' transforms these mechanical movements of the sensing element 4, 4' into electrical voltage pulses, which are then suitably amplified and finally analyzed.

Figure 3:
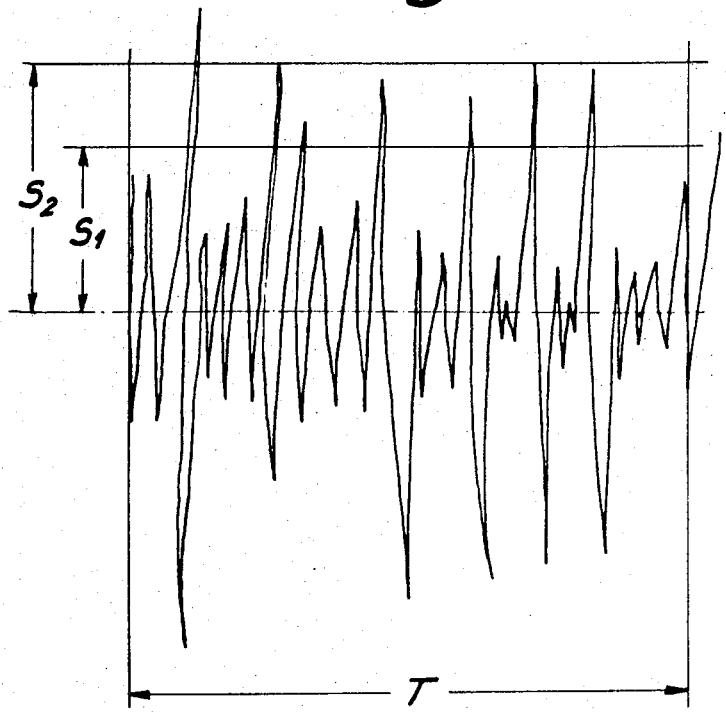
FIG. 3 is a diagram of the train of electrical pulses obtained in the process according to the invention.

FIG. 3 shows such a train of pulses. The amplitude of the individual pulse is thus a measurement of the size of the particle which has produced the respective deviation of the sensing element, while the frequency of the pulses is a measurement of the number of particles which have contacted the sensing element in a predetermined measuring interval of time T.

The analysis of the train of pulses for the purpose of determining the particle size distribution in the ground material then ensues in such a manner that the train of pulses is supplied to several filters, connected for example in parallel, which are adjusted to different threshold values (for example, $S_1$ and $S_2$) and from time to time transmit only those pulses whose amplitude exceeds the respective threshold value. Beyond these filters the transmitted pulses are then counted. Thus for example in the measuring interval of time T, the filter with the threshold value $S_1$ transmits a total of seven pulses and the filter with the threshold value $S_2$ transmits one pulse.

Calibration in the process according to the invention is accomplished by comparative tests with other processes. Thus the threshold values (for example $S_1$ and $S_2$) are so fixed that they correspond accurately to the particle sizes (for example 90 and 200 microns) for which the residue is to be determined. With this initial calibration, further the relationship between the number of pulses counted in the measuring interval of time T and the percentage residue corresponding thereto is determined.

When in accordance with the process of the invention the particle size distribution (i.e., the percentage residue in accordance with the particle size) has been determined, then with the air of a calculated curve which gives the specific surface (Blaine value in cm.$^2$/g.) as a function of the particle size, the mean specific surface of the ground material can be computed, if desired automatically by electrical means.

I claim:

1. A process for determining the particle size distribution in ground material, comprising the steps of leveling and compressing a layer of the ground material, and then bringing into contact with the layer of the ground material a mechanical sensing element which is deflectable with at least 1° of freedom, producing a relative movement of predetermined constant velocity between the sensing element and the ground material, transverse to the direction in which the sensing element is deflectable, converting the resulting mechanical deflections of the sensing element into electrical current or voltage pulses, and counting, from the resulting train of pulses, those pulses whose amplitude exceeds at least one threshold value which occur during a predetermined measuring interval of time.

2. Apparatus for determining the particle size distribution in ground material, comprising a conveyor for conducting a sample stream of ground material in a uniform linear movement, mechanism for leveling and compressing the stream of material into a uniform layer on the conveyor, a mechanical sensing element which is in contact with the uniform layer on the conveyor, which extends downward below the level determined by the leveling and compressing mechanism and thus penetrates into the layer of material on the conveyor and which is deflectable with at least 1° of freedom in a direction parallel to the surface of the layer and transverse to the direction of movement of the conveyor, and an electrical transducer for converting the resulting mechanical deflections of the sensing elements into pulses.

3. Apparatus according to claim 2 wherein the sensing element is in the form of a pin.

* * * * *